(12) United States Patent
Hogle (10) Patent No.: US 6,263,738 B1
(45) Date of Patent: Jul. 24, 2001

(54) VIBRATION PHASOR MONITORING SYSTEM FOR ROTATING MEMBERS

(75) Inventor: Joseph A. Hogle, Roanoke, VA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/382,623

(22) Filed: Aug. 25, 1999

(51) Int. Cl.$^7$ ...................................................... G01H 1/00
(52) U.S. Cl. ................................................ 73/593; 73/660
(58) Field of Search .................... 73/462, 593, 645, 73/646, 648, 650, 658, 659, 660; 702/33

(56) References Cited

U.S. PATENT DOCUMENTS

| | | | |
|---|---|---|---|
| 3,220,247 | 11/1965 | Goodman | 73/648 |
| 3,885,420 | 5/1975 | Wolfinger | 73/650 |
| 3,938,394 | 2/1976 | Morrow et al. | 73/462 |
| 4,015,480 | 4/1977 | Giers | 73/462 |
| 4,285,240 | * 8/1981 | Gold | 73/462 |
| 4,312,232 | 1/1982 | Stoutenburg | 73/659 |
| 4,513,619 | 4/1985 | Widdall | 73/462 |
| 5,201,224 | * 4/1993 | Rogers et al. | 73/462 |
| 5,329,814 | 7/1994 | Betz et al. | 73/462 |

FOREIGN PATENT DOCUMENTS 2 692 668   12/1993   (FR).
WO 99/20992   4/1999   (WO).

* cited by examiner

Primary Examiner—Helen Kwok
(74) Attorney, Agent, or Firm—Carl B. Horton; Kevin T. Ducan; Hunton & Williams (57) ABSTRACT

A vibration phasor monitoring system for real time determination of a vibration phasor magnitude and angle including a quadrature detector, implemented in software or hardware, whose reference phasors are locked in phase, via hardware, to a physical reference point on a rotating shaft. A vibration transducer and a transducer that senses a complete revolution of the shaft are disposed around the shaft. The transducers may be axially separated along the shaft. A clocking arrangement is implemented to determine the shaft angle at the time an output of the vibration transducer is read. Thereafter, the sine and cosine of the determined shaft angle are obtained and are used to multiply the vibration transducer output reading thereby resulting in respective projections of the vibration phasor on the sine and cosine reference phasors. These projections are then manipulated to obtain the vibration phasor angle and magnitude. Harmonic analysis in easily implemented by multiplying the generated shaft angle.

38 Claims, 7 Drawing Sheets

VIBRATION PHASOR MONITORING SYSTEM FOR ROTATING MEMBERS

BACKGROUND

The invention relates generally to monitoring a rotating member. More particularly, the invention relates to an apparatus and method for monitoring in real time a vibration phasor at the fundamental frequency of a rotating shaft to determine, for example, whether such vibration is within a prescribed limit or range.

Electrical generating equipment, which often includes a rotating member, is often relied upon for mission critical tasks where a failure thereof can lead to increased expense or possible catastrophic effects, including machinery breakdown or even bodily injury. Thus, it is desirable to monitor this equipment in an effort to prevent such failures. Specifically, turbines are often brought up to or down from operating speed in stepped intervals to, for example, reduce thermal stress on the equipment. However, a rotating machine has natural resonant frequencies, which frequencies sometimes coincide with frequencies generated during the acceleration or deceleration process. To reduce damage to the machinery, it is desirable that these points of resonance be avoided to the extent possible during the speeding up or slowing process.

Monitoring of rotating machinery, and electrical generating equipment in particular, can be accomplished by monitoring changes in both magnitude and angle (relative to an index point on a shaft, for example) of a vibration phasor or vector. Changes outside acceptable limits can be reason to trip or halt the machinery to avoid damage or avoid further damage from occurring. Alternatively, data indicative of changes outside the acceptable limits could be used by a control algorithm to operate differently and thereby restore vibration to a within acceptable limits. Significantly, changes in magnitude and/or angle may occur rapidly such as when the machinery incurs a structural failure. Rapid vibration changes may occur as a turbine's rotating frequency passes through resonant frequencies. Vibration phasor changes may also occur slowly as the result of expected or unintended component wear. Since there is the possibility that the changes may be rapid, it is desirable, for protection to be effective, that the magnitude and angle of the vibration phasor be determined continuously in real time.

In General Electric's prior art rotating member vibration phasor monitoring methods, vibration phasor magnitude and angle are determined by post-processing via Fourier analysis of an array of readings obtained from a displacement transducer. However, the delay caused by the accumulation of the readings and data transfer from the input and output (I/O) card to, for example, a personal computer-based human machine interface for subsequent processing results in magnitude and angle updates too slow for protection from or control of rapid vibration changes and thus this method is suitable, at best, only for trending to monitor component wear. A system based on Fourier analysis is in use in, for example, General Electric's Speedtronic Mark V turbine controller.

Another vibration monitoring technique is described in U.S. Pat. No. 3,220,247 to Goodman, which is directed to detecting vibration in marine propulsion equipment. In Goodman, sine and cosine generators are provided which generate reference signals with reference periods which are the same as the periods of an unbalance signal. The unbalance signals and reference signals are coupled to multipliers and the resulting products are passed through filtering circuits to obtain average or mean values. In Goodman, a physical connection of a tachometer-generator to a rotating shaft is necessary. Such a connection, however, may be complicated and therefore costly. Furthermore, the tachometer-generator is subject to mechanical wear and might require that the machinery being monitored be shut down in the case of its failure, even though the machinery itself is experiencing no malfunction. Such unnecessary shutdowns can be extremely expensive for power plant operators and others. Further still, the 90 degree quadrature relationship of the sine and cosine references from the tachometer-generator is critical to the accuracy of any calculations. Unfortunately the 90 degree relationship relies on manufacturing tolerances in placing the respective windings of the tachometer-generator at 90 degrees from each other. Also, Goodman's device does not supply the vibration phasor angle in a form usable for automatic protection or control. The data is only available for display via an oscilloscope. Even the displayed data provides only a crude means of visually determining the angle. Additionally, the reference point on the rotating shaft to which the phasor angle is measured in Goodman is that point in shaft rotation that results in the tachometer-generator's sine output equal to 0 and cosine output equal to 1. If the coupling of the tachometer-generator to the shaft slips, the reference point on the shaft slips, i.e., moves as well. Finally, examination of harmonic vibrations in Goodman's apparatus would require a gear box or a multiple winding tachometer-generator, which adds yet further complications and expense.

Another vibration monitoring technique is described in U.S. Pat. No. 4,015,480 to Giers, which is directed to instantaneous measurement of unbalance. This apparatus includes the multiplication of the sine and cosine components of a reference phasor with multiple readings of vibration magnitude. Giers' apparatus, however, is also deficient in a number ways. The apparatus requires physical connection of the clock generator, or in the case of a physical reference generator, both the reference and clock generator, to the rotating shaft. Such a connection may be difficult to accomplish and therefore undesirable. Further, Giers' sampling frequency is dependent on the number of holes on the outer circumference of the disk in the clock generator. A high sampling frequency as desired for accurate and high resolution calculation of the phasor magnitude and angle would require an ever larger disk with more holes, which could become unmanageable. Further still, Giers' apparatus requires synchronization of the reference and clock generators and compensates for less than perfect synchronization by increasing the sampling frequency. However, sampling frequency is limited to the number of holes as discussed above.

Further still, consistent and accurate sampling frequency and period in Giers depends on accurate placement of the holes in the disk of his clock generator. This requires precision manufacturing techniques. Also, as with Goodman, examination of harmonic vibrations would require a gear box.

Thus there is a need for a simple, real-time method and apparatus for accurately and effectively monitoring a vibration phasor in a rotating member for effective monitoring and control.

SUMMARY OF THE PREFERRED EMBODIMENTS

Therefore, it is intended to provide, by the apparatus and method described herein, in real time a vibration phasor magnitude and angle with respect to a reference point on a rotating member, preferably a shaft of a rotating machine such as a prime mover of an electrical generator, e.g., a gas or steam turbine. Producing such parameters of vibration with accuracy provides the advantage of applying beneficial protection to machinery that may experience structural failure or component wear. For instance, such machinery may be "tripped" or halted in a timely fashion, thereby avoiding damage or additional damage. Alternatively, the parameters of vibration may be used by a controller system to move the operating point of the machine in such a fashion as to reduce vibration to a rated level. The preferred embodiment effectively provides the vibration parameters in real time via a simple, cost effective, robust and flexible design.

More particularly, a quadrature detector, implemented in software or hardware, whose reference phasors are locked in phase, via hardware, to a physical reference point on a rotating shaft is used for real time determination of a vibration phasor magnitude and angle. A displacement transducer sensing vibration and a displacement transducer that senses a complete revolution of the shaft are disposed around a shaft. The transducers may also be axially and/or circumferentially separated along the shaft. A clocking arrangement is implemented to determine the shaft angle at the time an output of the vibration transducer is read.

Thereafter, the sine and cosine of the determined shaft angle are obtained and are used to multiply the vibration transducer output reading thereby resulting in respective projections of the vibration phasor on the unity amplitude sine and cosine reference phasors. These projections are then manipulated to obtain the vibration phasor angle and magnitude.

Thus, for each single reading of the vibration transducer the invention will yield both a new vibration phasor magnitude and new angle resulting in a true real-time measurement of vibration in a rotating member.

And, unlike the devices described by Goodman and Giers, no physical connection to the shaft of the machine is necessary, perfect quadrature of reference phasors is provided, accurate and usable vibration phasor magnitude and angle information is immediately available and analysis of harmonics is easily implemented.

DETAILED DESCRIPTION

Figure 1:
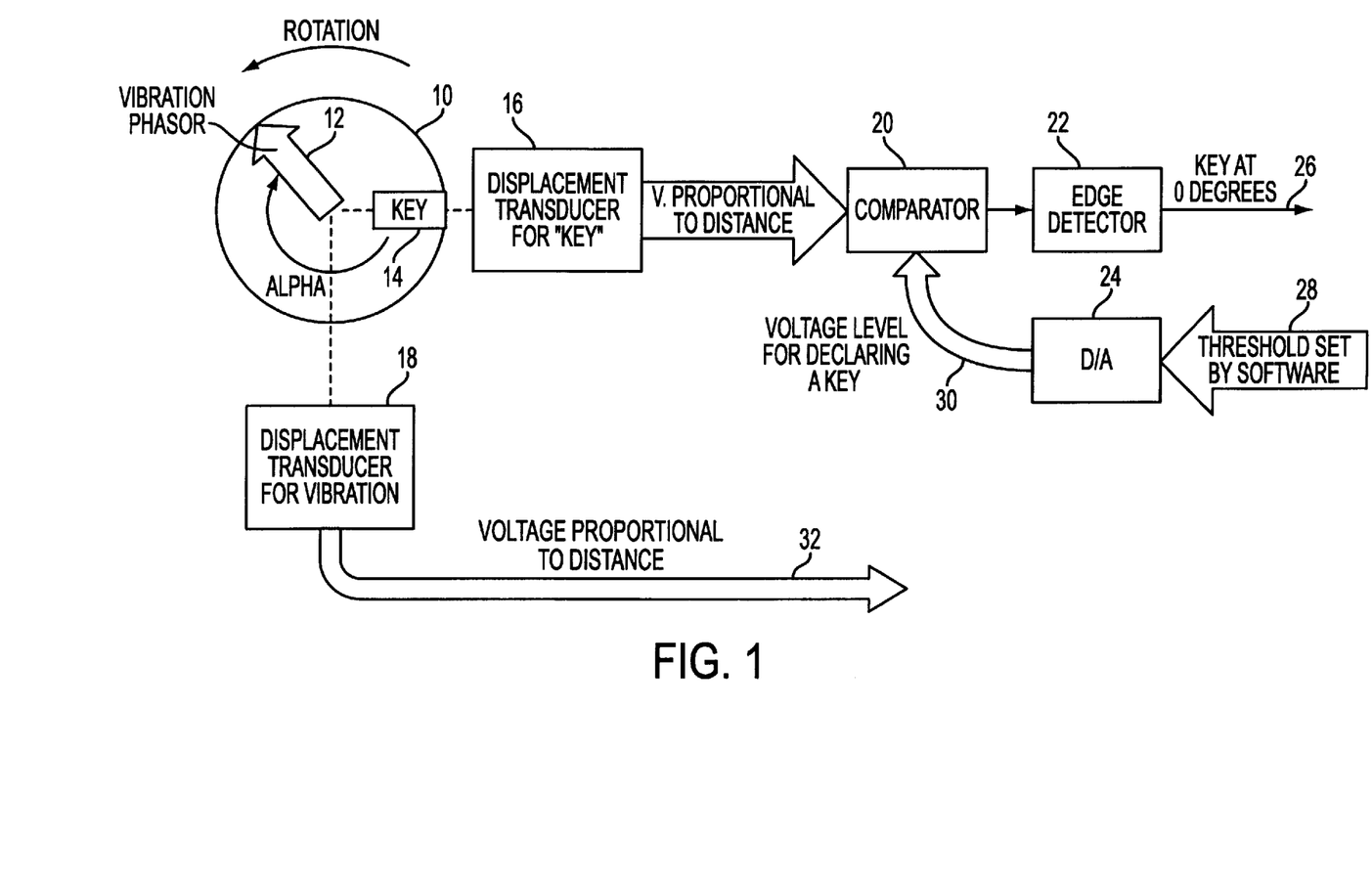
FIGS. 1–3 schematically illustrate a vibration phasor detection system in accordance with a preferred embodiment.
Figure 4A:
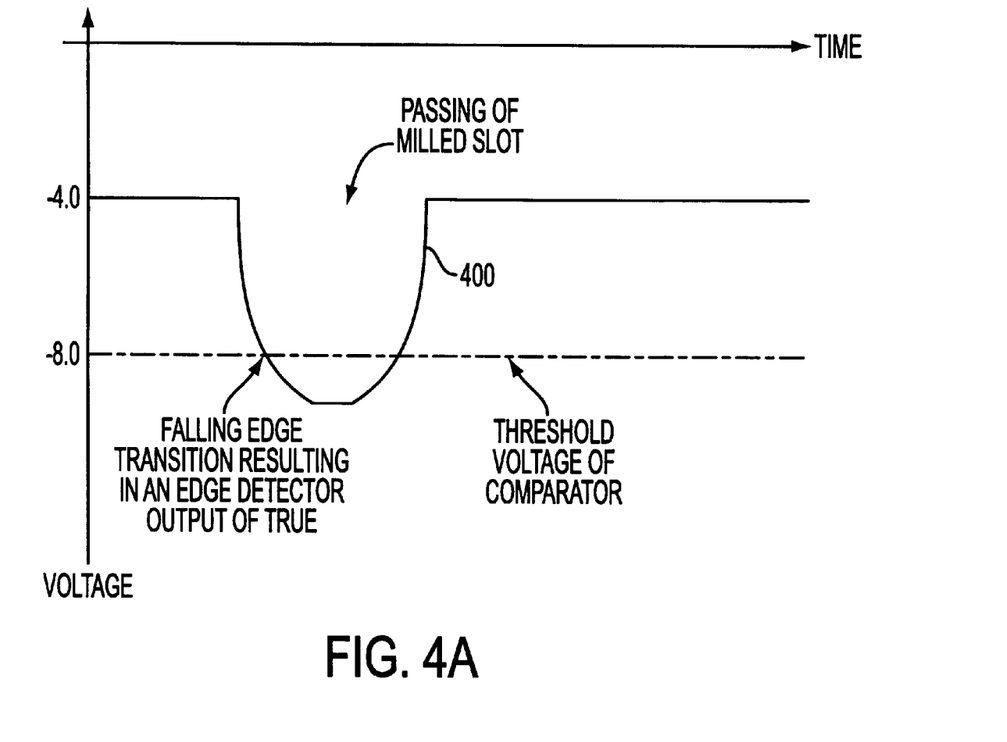
FIGS. 4A and 4B graphically depict the output of a transducer monitoring a milled slot or milled pedestal serving as a key of a rotating member in accordance with a preferred embodiment.
Figure 4B:
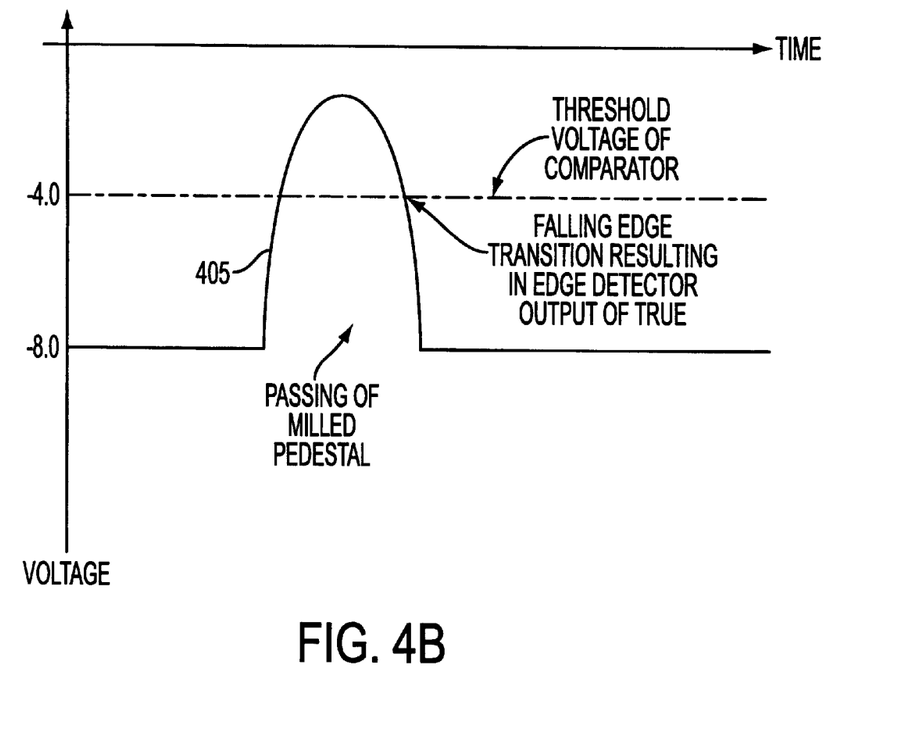
Figure 5:
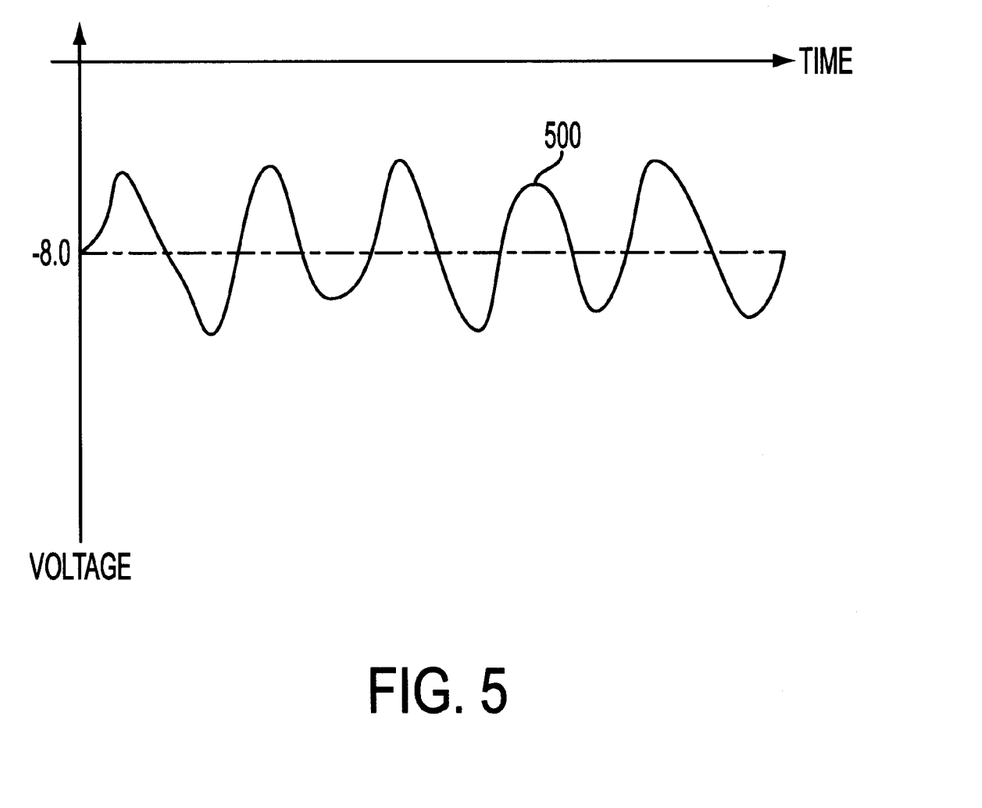
FIG. 5 graphically depicts the output of a displacement transducer for vibration associated with the rotating member in accordance with a preferred embodiment.

Reference is now made to the figures for a more detailed description of the preferred embodiment. FIG. 1 shows a rotating member 10, in this case a shaft of a turbine for example, having a vibration component 12 at the fundamental frequency of shaft rotation when shaft 10 is rotating. Of course, the shaft described herein can be associated with any type of rotating machinery. Two displacement transducers 16, 18 are disposed around in close proximity to, but not in contact with, the shaft 10. Transducer 16 monitors the presence of a key or milled slot 14 disposed on shaft 10 and preferably is placed such that it will respond to displacement, i.e., distance changes with the passing of the key 14. Alternatively, transducer 16 could monitor a milled pedestal as opposed to the aforementioned milled slot. FIGS. 4A and 4B depict typical voltage signals 400, 405 output from transducer 16 upon passing of a milled slot or milled pedestal. Transducer 18, on the other hand, is a displacement transducer for measuring vibration. Transducer 18 may be placed axially anywhere along shaft 10 where it is desired to determine a vibration phasor 12. FIG. 5 illustrates a typical voltage signal 500 output from transducer 18 when a vibration, i.e., displacement, is sensed by the transducer 18. As can be understood by inspecting FIGS. 4A, 4B and 5, transducers 16, 18 each produce an output voltage proportional to the distance between the transducer face and the rotating shaft 10. The D.C. component of these voltages is proportional to the distance between the transducer with the shaft 10 at rest (assuming negligible shaft run out). This distance is sometimes referred to as the gap or air gap between the transducer 16 or 18 and shaft 10. The dynamic or A.C. component of the voltage signals 400, 405 or 500 shown in FIGS. 4A, 4B and 5, respectively, is proportional to the increasing or decreasing distance due to vibration or, in the case of the key transducer 16, the passing of the key 14. It is noted that the angular relationship between transducers 16, 18 is not critical and can be set as desired as this relationship does not affect properly calculating the angle of the vibration phasor.

As shown in FIG. 1, signal conditioning circuitry is preferably provided to process the voltage signal 400 or 405 that is output from transducer 16. Specifically, it is, in accordance with the preferred embodiment, desired to create a logic signal 26 momentarily TRUE when the key 14 passes transducer 16, and FALSE otherwise. This is accomplished with a voltage comparator 20 and edge detector 22 combination, preferably with hysteresis, that compares the output of transducer 16 against a predetermined level 30 which defines the threshold for a key passing event. The predetermined comparison level 30 is preferably set via software (although it could be hard wired), communicated via bus 28 and is converted to an analog signal in D/A converter 24. The output of comparator/edge detector 20, 22 combination, preferably triggered on the falling edge of signals 400 or 405, produces logic signal 26 indicating "key at 0 degrees" when TRUE.

Figure 2:
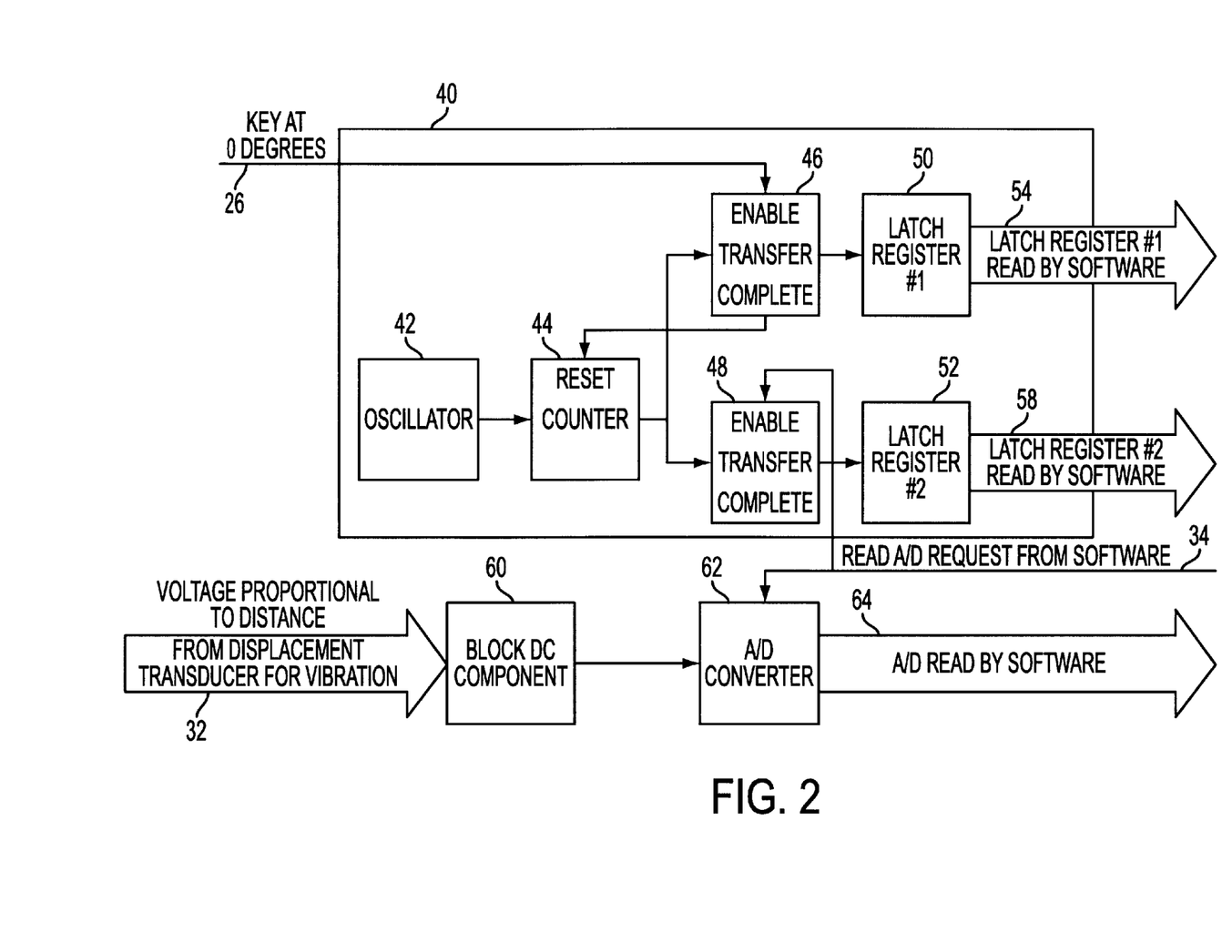

FIG. 2 depicts a field programmable gate array 40 that provides much of the remaining signal conditioning functionality according to the preferred embodiment. Of course, it will be understood by those of ordinary skill in the art that the functions carried out by the field programmable gate array (FPGA) 40 may be carried out with discrete components, entirely in software or some combination thereof, depending on implementation circumstances. In FPGA 40 an oscillator 42 is used to feed a counter 44. The frequency of the oscillator 42 and the bit width of counter 44 are chosen in view of the accuracy to which vibration phasor magnitude and angular measurement are desired. For example, in the preferred embodiment, a 6.25 megahertz oscillator 42 is implemented to feed a 24 bit counter 44 for use in an electrical power generating turbine spinning up to 18,000 rpm, or at a 300 Hz shaft speed. However, as noted, any clock or oscillator speed and counter size may be chosen depending on the particular application. The contents of counter 44 is, upon receipt of either of two independent enabling signals 26 ("key at 0 degrees" logic signal) or 34, transferred via transfer blocks 46, 48 to one or the other of two latch registers 50, 52.

More specifically, the transfer of the count in counter 44 to latch register 50 preferably is enabled when signal 26 is TRUE, i.e., a key phasor interrupt signal occurs. Additionally, once the transfer to latch register 50 has been completed, counter 44 is reset to zero. This reset avoids having to compute a delta count and/or having to compensate for counter rollover. Thus, latch register 50 contains the number of 6.25 MHz pulses that the oscillator 42 has produced during the time that has elapsed between successive occurrences of the key 14 passing transducer 16. Accordingly, the count in latch register 50 represents a period measurement of to successive key passings of transducer 16 in terms of 6.25 MHz ticks.

The transfer of the count of counter 44 to latch register 52 is preferably enabled in response to a read request line 34 that is also connected to A/D converter 62 associated with the output 32 of transducer 18. Operation of read request line 34 is preferably controlled by a microprocessor (not shown), which initiates in a periodic manner a reading at a preferred frequency of 1322.75 Hz of the output of transducer 18. The digitized read value is shown as 64 in FIGS. 2 and 3. No resetting of the counter 44 occurs at the time of transfer to latch register 52. Latch register 52 therefore contains the number of 6.25 MHz pulses or ticks that the oscillator 42 has produced from the time of the last key phasor reset occurrence, i.e., "key at 0 degrees" logic signal 26, until the reading of A/D converter 62 occurs. Note that block 60 in FIG. 2 removes the D.C. component of the vibration measurement, i.e., any offset caused by the gap.

Figure 3:
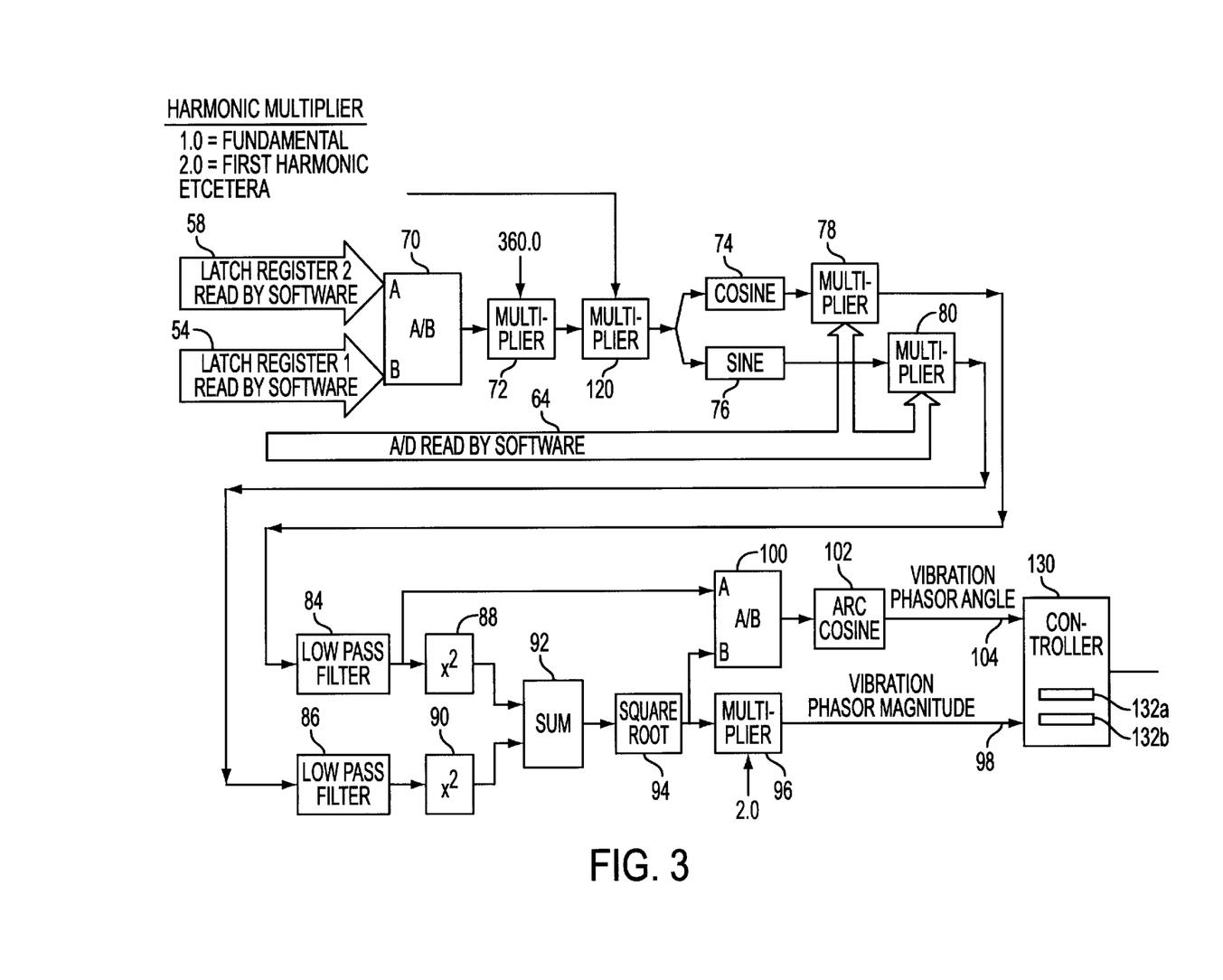

The significance of the latch registers 50, 52 lies in the ratio of the contents 58 of latch register 52 divided by the contents 54 of latch register 50. This ratio, as shown in FIG. 3, is determined via divider or ratio block 70 at the time of processing the vibration reading 64. The ratio or value output from block 70 represents the fractional part of complete a shaft revolution relative to the key phasor that occurred at the instant the vibration reading takes place. This fractional part of a revolution is multiplied by 360 degrees in multiplier 72 and becomes the shaft angle from transducer 16 (0 degrees) at the time of reading the output of transducer 18, which reading is shown as 64 in the drawings. The shaft angle obtained from multiplier 72 is also shown graphically in FIG. 6 as element 113, which is also, as explained below, the angle of one of a quadrature pair of unity phasors phase locked to the key 14.

Figure 6:
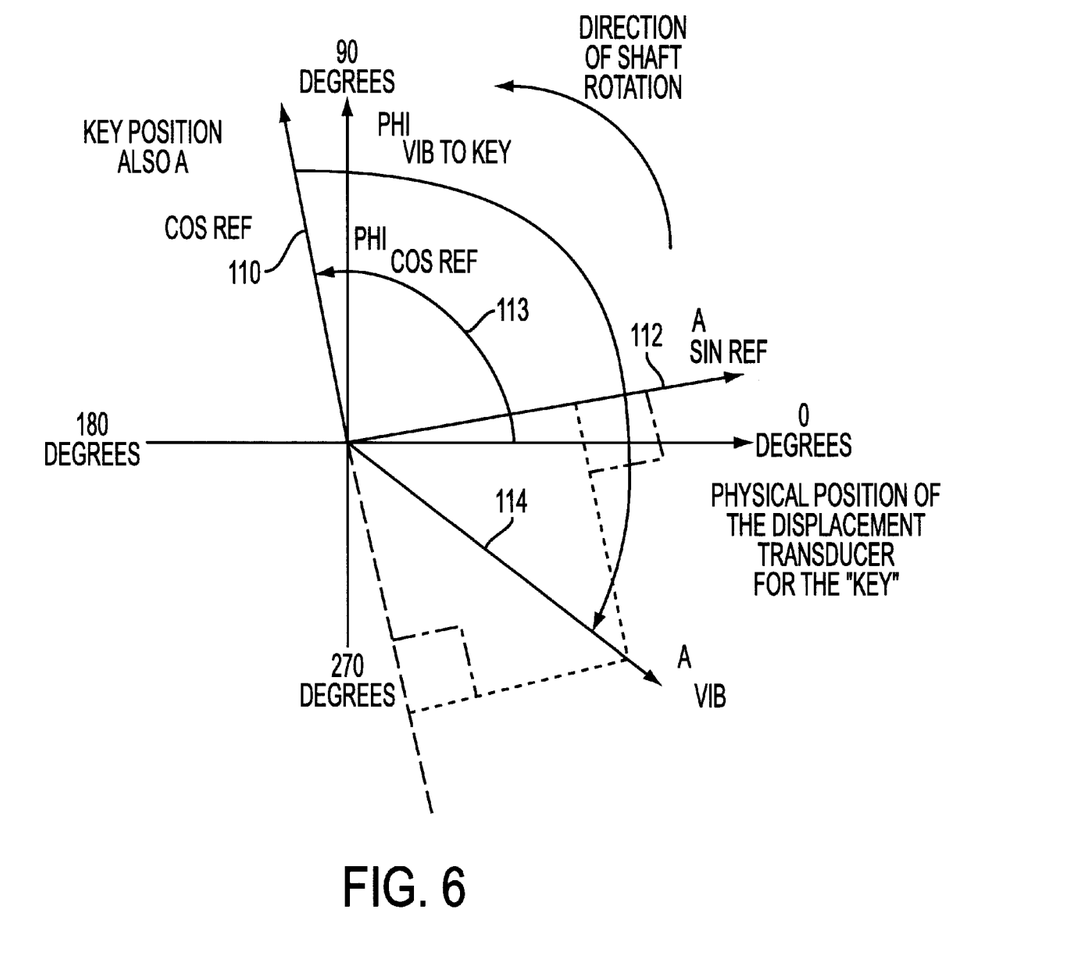
FIG. 6 illustrates a possible relationship among a vibration phasor and a quadrature pair of unity reference phasors.

FIG. 3 further shows the implementation of a phase locked quadrature detector in accordance with the preferred embodiment and FIG. 6 illustrates graphically a possible relationship of the vibration phasor to the quadrature pair of unity reference phasors. The angle output from multiplier 72 is used to establish a quadrature pair of unity phasors. A unity cosine reference phasor 110 obtained via cosine block 74 represents a phasor in phase with the slot or key 14. A unity sine reference phasor 112 obtained via block 76 represents a phasor lagging the key phasor by 90 degrees. By 90 degrees lagging, it is meant that this phasor is 90 degrees backward from the milled slot or milled pedestal serving as key 14 in terms of the direction of shaft rotation.

Using the unity reference phasors thus obtained, quadrature detection on the reading of the vibration phasor 114 whose instantaneous magnitude at the time of sampling is measured via A/D converter 62 is performed. That is, in accordance with the preferred embodiment, signal 64 is multiplied by each of the unity reference phasors. Each of these multiplications results in a composite signal. An "A.C." portion of the composite is a sinusoid at twice the frequency of the shaft. A "D.C." portion of the composite signal is half the projection of the vibration phasor upon the unity reference phasor it was multiplied by. A mathematical analysis of phasor multiplications is set forth below.

To extract just the projections, a low pass filter 84 or 86 is applied to each of products output by multipliers 78, 80. The filters' cutoff frequency and order are chosen to provide the desired response for the magnitude and angle determination while minimizing any ripple in these outputs. For example, in a preferred implementation, sixth order low pass filters with a cutoff frequency of 0.25 Hz are used. This filtering results in essentially having resolved the vibration phasor into its projections onto the two unity quadrature phasors 110, 112, one of which (phasor 110) is in phase with the milled slot or key 14. The projection magnitudes are half of what they should be (see the mathematical analysis), but this is dealt with as explained below.

Thus, to determine magnitude and angle of the vibration phasor 114, the remaining functionality shown in FIG. 3 is implemented. Specifically, the outputs of low pass filters 84, 86 are squared in squaring blocks 88, 90 and added together in summing block 92. The square root of the resulting sum obtained via square root function 94 is half the magnitude of the vibration phasor 114 and is therefore multiplied by 2 in multiplier block 96. The angle between the vibration phasor 114 and the cosine reference phasor is the same as the angle between the vibration phasor 114 and the milled slot or key 14. To obtain this angle, the arccosine of half the vibration phasor's projection on the unity cosine reference phasor 110 divided by half the magnitude of the vibration phasor 114 is determined via blocks 100 and 102. The quantity one half the vibration phasor's projection on the unity cosine reference phasor is available from the output of the low pass filter 84, for example, and the quantity one half the vibration phasor magnitude is available from the square root of the sum of the squares of the low pass filter outputs, i.e., the output of square root function block 94. Accordingly, both the vibration phasor magnitude 98 and vibration phasor angle 104 are available in real time. As such, the magnitude and/or angle of the vibration phasor can be compared to threshold values, which, if exceeded, can be used to initiate the tripping or halting of the rotating machinery thereby avoiding damage or additional damage from occurring.

In order to study harmonics of shaft vibration multiplier 120 is provided between the output of multiplier 72 and cosine and sine blocks 74, 76. To analyze the fundamental frequency of vibration, the input to multiplier 120 is set to 1. On the other hand, analysis of the harmonic components of any vibration can be studied by inputting a 2 or higher value into multiplier 120. Thus, by simply changing the multiplier value input to multiplier 120 harmonic analysis can be effected.

Further, the vibration phasor magnitude 98 and vibration phasor angle 104 are preferably input to a control block 130 that monitors the magnitude and angle and responds in a desired fashion if either or both of these values are deemed to be outside of acceptable limits or beyond a rated value. In response to such conditions, control block 130 can initiate equipment speed control and/or shutdown, for example. Control block 130 preferably also includes readouts 132*a*, 132*b* for the vibration phasor magnitude and angle.

The following analysis provides a mathematical basis for the circuitry and method in accordance with the preferred embodiment.

MATHEMATICAL ANALYSIS

Multiplication of the vibration phasor by either reference phasor is governed by the following equation.

$$[A_{vib} \sin(\omega_{vib}t+\phi_{vib})][A_{ref}\sin(\omega_{ref}t+\phi_{ref})]=$$
$$[A_{vib}A_{ref}/2)\cos((\omega_{vib}t+\phi_{vib})-(\omega_{ref}t+\phi_{ref}))]-$$
$$[A_{vib}A_{ref}/2)\cos((\omega_{vib}t+\phi_{vib})+(\omega_{ref}t+\phi_{ref}))] \quad \text{(Eq. 1)}$$

For the two phasors at the same frequency, i.e., $\omega=\omega_{vib}=\omega_{ref}$ then equation 1 becomes:

$$[A_{in}\sin(\omega_{vib}t+\phi_{vib})][A_{ref}\sin(\omega_{ref}t+\phi_{ref})]=[(A_{vib}A_{ref}/2)\cos(\phi_{vib}-\phi_{ref})]-[(A_{vib}A_{ref}/2)\cos(2\omega t+\phi_{vib}+\phi_{ref})] \quad \text{(Eq. 2)}$$

From this it is observed there is a D.C. term, i.e. the first bracket as well as an A.C. term, i.e. the second bracket. The D.C. term is present only when the two phasors are at the same frequency. If equation 2 is passed through a low pass filter to remove the A.C. component while passing the D.C. component, equation 2 will simplify as follows:

$$\text{Filtered}\{[A_{vib}\sin(\omega_{vib}t+\phi vib)][A_{ref}\sin(\omega_{ref}t+\phi_{ref})]\}=[(A_{vib}A_{ref}/2)\cos(\phi_{vib}-_{ref})] \quad \text{(Eq. 3)}$$

If the reference phasor is chosen to be a unity phasor, i.e. $A_{ref}=1$, equation 3 further simplifies to:

$$\text{Filtered}\{[A_{vib}\sin(\omega_{vib}t+\phi_{vib})][A_{ref}\sin\omega_{ref}t+\phi_{ref})]\}=[(A_{vib}/2)\cos(\phi_{vib}-\phi_{ref})] \quad \text{(Eq. 4)}$$

It is now helpful to refer to FIG. 6.
By definition $$\cos(\phi_{vib}-\phi_{ref})=(\text{adjacent/hypotenuse})=(\text{projection of } A_{vib} \text{ onto } A_{ref})/A_{vib} \quad \text{(Eq. 5)}$$

Solving equation 5 for the term (projection of $A_{vib}$ onto $A_{ref}$) yields $$(\text{projection of } A_{vib} \text{ onto } A_{ref})=A_{vib}\cos(\phi_{vib}-\phi_{ref}) \quad \text{(Eq. 6)}$$

Comparing equation 6 to equation 4, it is apparent that:

$$\text{Filtered}\{[A_{vib}\sin(\omega_{vib}t+\phi_{vib})][A_{ref}\sin(\omega_{ref}t+\phi_{ref})]\}=(\text{projection of } A_{vib} \text{ onto } A_{ref})/2 \quad \text{(Eq. 7)}$$

In other words the filter output is one half the projection of the vibration phasor onto the reference phasor.

Thus, in accordance with the preferred embodiment, a real-time vibration phasor monitoring system is provided that quickly and accurately measures both the magnitude and angle of a vibration phasor of a rotating member.

While the foregoing description includes numerous details and specifics, it is to be understood that these are provided for purposes of explanation only, and are not intended to limit the scope of the invention. Those of ordinary skill in the art will easily be able to make numerous modifications to the exemplary embodiments described above without departing from the scope of the invention, as defined by the following claims and their legal equivalents.

What is claimed is:

1. A method of monitoring a vibration phasor in a rotating member, comprising the steps of:
   acquiring at a predetermined time a magnitude of a vibration in said rotating member;
   acquiring at said predetermined time an angle of said rotating member, wherein said angle acquiring step comprises:
   generating a signal indicative of a full rotation of said rotating member;
   incrementing a counter until said signal is again generated, storing a first count of said counter and resetting said counter;
   reading and storing a second count of said counter at the time of said magnitude acquiring step; and
   dividing said second count by said first count;
   determining respective projections of said vibration phasor on a quadrature pair of reference phasors phase locked with said rotating member;
   filtering said projections through at least one low pass filter;
   calculating a quantity equal to the square root of the sum of the squares of said projections; and
   determining at least one of magnitude and angle of said vibration phasor by, respectively, multiplying said quantity by 2 and obtaining an arccosine of a value equal to one of said projections divided by said quantity.

2. The method of claim 1, wherein said magnitude acquiring step comprises measuring an output of a transducer disposed proximate said rotating member.

3. The method of claim 1, wherein said counter is incremented by an oscillator.

4. The method of claim 3, wherein said oscillator has a frequency of about 6.25 MHz.

5. The method of claim 1, further comprising blocking a D.C. component of said magnitude of said vibration.

6. The method of claim 1, further comprising A/D converting said magnitude of said vibration.

7. The method of claim 1, further comprising comparing said signal to a predetermined threshold and generating a logic signal TRUE if said signal has a magnitude greater than said predetermined threshold.

8. The method of claim 7, further comprising modifying said predetermined threshold.

9. The method of claim 1, wherein said projections determining step comprises:
   calculating sine and cosine values of said angle and multiplying same, respectively, by said magnitude of said vibration.

10. The method of claim 1, further comprising the step of multiplying said angle by a predetermined number to obtain an analysis of a harmonic component of said vibration.

11. A method for measuring a vibration phasor of a shaft of a rotating member, comprising the steps of:
   resetting a counter and initiating the incrementing of said counter in response to a signal indicative of a complete revolution of said shaft;
   storing a first count of said counter corresponding to the count present therein immediately before said resetting step;
   reading at a predetermined time a value indicative of a magnitude of vibration of said shaft;
   storing a second count of said counter corresponding to the count present therein at an instant of said predetermined time;
   dividing said second count by said first count and multiplying the resulting product by 360 degrees to obtain a shaft angle corresponding to said predetermined time;
   multiplying said value indicative of a magnitude of vibration of said shaft by sine and cosine components of said shaft angle thereby obtaining respective projections of said vibration phasor on a quadrature pair of reference phasors phase locked with said rotating shaft;

filtering each of said projections through respective low pass filters;

calculating a quantity equal to the square root of the sum of the squares of said projections; and determining at least one of magnitude and angle of said vibration phasor by, respectively, multiplying said quantity by 2 and obtaining, an arccosine of a value equal to one of said projections divided by said quantity.

12. The method of claim 11, further comprising incrementing said counter by an oscillator.

13. The method of claim 12, wherein said oscillator has a frequency of about 6.25 MHz.

14. The method of claim 11, further comprising blocking a D.C. component of said value indicative of a magnitude of vibration of said shaft.

15. The method of claim 11, further comprising A/D converting said value indicative of a magnitude of vibration of said shaft.

16. The method of claim 11, further comprising comparing said signal to a predetermined threshold and generating a logic signal TRUE if said signal has a magnitude greater than said predetermined threshold.

17. The method of claim 16, further comprising modifying said predetermined threshold.

18. The method of claim 11, wherein said projections determining step comprises:

calculating sine and cosine values of said angle and multiplying same, respectively, by said magnitude of said vibration.

19. The method of claim 11, further comprising multiplying said shaft angle by a value to effect harmonic analysis of said vibration phasor.

20. An apparatus for measuring a vibration phasor in a rotating member, comprising:

means for acquiring an instantaneous measurement of magnitude of a vibration in said rotating member;

means for acquiring an angle of said rotating member at a time of said instantaneous measurement of magnitude of a vibration in said rotating member, said means for acquiring an angle including means for generating a signal indicative of a full rotation of said rotating member, means for incrementing a counter until said signal is again generated upon a subsequent full revolution of said rotating member and storing a first count of said counter present therein in response to said signal, means for reading and storing a second count of said counter at a time of said instantaneous measurement of magnitude is effected, and means for dividing said second count by said first count;

means for determining respective projections of said vibration phasor on a quadrature pair of reference phasors phase locked with said angle of said rotating member;

means for low pass filtering said projections;

means for calculating a quantity equal to the square root of the sum of the squares of said projections; and means for determining at least one of magnitude and angle of said vibration phasor by, respectively, multiplying said quantity by 2 and obtaining an arccosine of a value equal to one of said projections divided by said quantity.

21. The apparatus of claim 20, wherein said means for acquiring said magnitude comprises a vibration transducer.

22. The apparatus of claim 20, further comprising an oscillator for incrementing said counter.

23. The apparatus of claim 22, wherein said oscillator has a frequency of about 6.25 MHz.

24. The apparatus of claim 20, further comprising means for blocking a D.C. component of said magnitude of vibration.

25. The apparatus of claim 20, further comprising means for A/D converting said magnitude of said vibration.

26. The apparatus of claim 22, further comprising means for comparing said signal to a predetermined threshold and generating a logic signal TRUE if said signal has a magnitude greater than said predetermined threshold.

27. The apparatus of claim 26, further comprising means for modifying said predetermined threshold.

28. The apparatus of claim 20, wherein said means for determining said projections comprises means for calculating sine and cosine values of said angle and means for multiplying said sine and cosine values, respectively, by said magnitude of said vibration.

29. The apparatus of claim 20, further comprising means for effecting harmonic analysis of said vibration phasor.

30. An apparatus for measuring a vibration phasor in a rotating member of a machine, comprising:

a vibration transducer disposed proximate said rotating member, said vibration transducer generating an instantaneous measurement of magnitude of a vibration in said rotating member upon receipt of a read request;

a key transducer disposed proximate said rotating member, said key transducer generating a key signal upon sensing of a key associated with said rotating member;

a counter being incremented between successive key signals and being reset in response to each key signal;

a first register linked to said counter and storing a first count thereof present immediately before being reset;

a second register linked to said counter and storing a second count thereof at a time of said read request;

a divider connected to outputs of said first and second registers and generating a ratio of said second count to said first count;

a first multiplier connected to said divider and multiplying said ratio by 360 degrees to obtain an angle of said rotating member at the time of said read request, and sine and cosine generating circuits connected to said first multiplier, said sine and cosine generating circuits generating a quadrature pair of phasors in phase with said vibration phasor; and second and third multipliers connected, respectively, to outputs of said sine and cosine generating circuits and an output of said vibration transducer, said second and third multipliers outputting respective projections of said vibration phasor on said quadrature pair of phasors;

first and second low pass filters respectively connected to outputs of said second and third multipliers;

means, connected to said low pass filters, for calculating a quantity equal to the square root of the sum of the squares of said projections; and means, connected to at least said means for calculating a quantity, for determining at least one of magnitude and angle of said vibration phasor by, respectively, multiplying said quantity by 2 and obtaining an arccosine of a value equal to one of said projections divided by said quantity.

31. The apparatus of claim 30, wherein an oscillator increments said counter.

32. The apparatus of claim 31, wherein said oscillator has a frequency of about 6.25 MHz.

33. The apparatus of claim 30, further comprising a D.C. blocking circuit connected to said vibration transducer.

34. The apparatus of claim 30, wherein the said divider and multipliers are digitally implemented.

35. The apparatus of claim 30, further comprising a comparator having said key signal and a threshold value as inputs, wherein an output of said comparator is TRUE if said output of said key transducer has a magnitude greater than said threshold value.

36. The apparatus of claim 35, further comprising means for modifying said threshold value.

37. The apparatus of claim 30, further comprising a another multiplier connected between said first multiplier and said sine and cosine generating circuits.

38. The apparatus of claim 30, further comprising a controller connected to said means for determining at least one of magnitude and angle of said phasor vibration.

* * * * *